United States Patent [19]
Benz et al.

[11] 3,904,880
[45] Sept. 9, 1975

[54] MULTI-COMPONENT INFRARED ANALYZER

[75] Inventors: Donald E. Benz, Young America; James H. Garfunkel, Mound; Arlon D. Kompelien, Minneapolis, all of Minn.

[73] Assignee: Honeywell Inc., Minneapolis, Minn.

[22] Filed: May 10, 1973

[21] Appl. No.: 359,144

[52] U.S. Cl. .............................. 250/343; 250/343
[51] Int. Cl.² ........................................ G01N 21/26
[58] Field of Search ........... 250/339, 343, 344, 345, 250/346

[56] References Cited
UNITED STATES PATENTS

| | | | |
|---|---|---|---|
| 3,498,132 | 3/1970 | Smith | 250/343 |
| 3,678,262 | 7/1972 | Herrmann | 250/343 |
| 3,679,899 | 7/1972 | Dimeff | 250/343 |
| 3,793,525 | 2/1974 | Burch | 250/343 |

*Primary Examiner*—Craig E. Church
*Attorney, Agent, or Firm*—Charles G. Mersereau

[57] ABSTRACT

A multi-component nondispersive infrared correlation spectrometer for selectively analyzing for a plurality of gases of interest in a gaseous mixture utilizes a rotating filter wheel containing filter systems corresponding to each gas of interest sought. Each filter system contains an ordered pair of filters to sequentially create filtered reference and analysis paths for each gas of interest between a source of infrared radiation and a detector. Special synchronization and signal analysis systems are provided to produce an output signal for each gas of interest. These systems are coordinated with the rotation of the filter wheel in a manner which allows a plurality of gases of interest to be analyzed with simultaneous output.

46 Claims, 7 Drawing Figures

MULTI-COMPONENT INFRARED ANALYZER

CROSS-REFERENCE TO RELATED APPLICATION

Reference is made to the co-pending application by Burton Krakow, Ser. No. 359,162, filed of even date, and assigned to the same assignee, which is also concerned with a nondispersive infrared analyzer.

By that invention a partially dual-beam analyzer is provided in which both beams pass through a single combination which includes a narrow bandpass optical filter centered on that part of the infrared absorption spectrum in which the gas of interest has at least one strong absorption line, a gas filter which may contain gas having infrared absorption spectrum overlapping that of the gas of interest in the narrow band of the narrow bandpass optical filter, and a single non-selective detector. That system has the effect of providing excellent specificity because a narrow band may normally be selected wherein no known gas will have an infrared spectrum directly correlated with the gas of interest. Also, by using the same narrow bandpass filter, gas filter and utilizing the same detector in both reference and analysis paths, errors introduced by changes in the source energy and/or changes in the detector output are automatically compensated.

The present invention, on the other hand, is concerned with a single path multi-component analyzer in which a plurality of pairs of filters are disposed in an infrared radiation path each pair providing a reference and an analysis filter for a gas of interest. The sequentially transmitted energy is sequentially detected by a single detector by the use of a special synchronization system and multiplexing signal analysis system which also allows a simultaneous output for a plurality of gases of interest in a single instrument.

BACKGROUND OF THE INVENTION

1. Field of the Invention

The present invention relates generally to nondispersive infrared analyzers and, more particularly, to an improved multi-component analyzer having special synchronization and signal processing systems.

2. Description of the Prior Art

It has long been known that certain heteroatomic gases have individual characteristic infrared absorption spectra and that such gases absorb infrared energy in an amount proportional to the number of molecules of that gas present in a gaseous mixture. The knowledge of these facts has led to the development of analytical instruments which apply these principles to the quantitative analysis of gas mixtures.

One type of analyzer is a dual-path analyzer in which the infrared absorption from a reference beam is compared with that from a sensitized beam in a manner which renders the difference between the energy absorbed from each of the two beams dependent only upon the amount of the specific gas of interest to be determined in the sample. Normally, the reference beam traverses a gas which does not absorb infrared, for example, nitrogen, followed by a sample cell containing a sample of the gas to be analyzed, and proceeds finally to a detector which is adapted to produce signal in relation to the amount of infrared energy detected. The signal produced by the absorption in this beam is then compared with that of a second beam which traverses a sensitizing cell which contains the gas of interest and the sample cell before striking the detector. Various additional filters may be used in line with the above to enhance the specificity of the analyzer by eliminating the interference caused by gases which have infrared spectra overlapping that of the gas of interest. These include, filtering out part of the infrared spectrum in which such interfering gases strongly absorb or placing an additional filter cell containing the interfering gas(es) in line with both beams of the system in order for the interfering spectrum to be removed from both beams prior to striking the detector.

Several attempts have been made in the prior art to adapt a dual-path analyzer of the general type described to analyze a plurality of gases of interest. One such instrument is illustrated and described in a patent to Hutchins U.S. Pat. No. 2,720,594, issued Oct. 11, 1955, which illustrates and describes a dual-beam system employing mechanically synchronized rotating filter wheels adapted to align sensitizing cells and a reference cell simultaneously in series with a sample cell for the analysis of each gas. By rotating the wheels and changing the pairs of cells in line with the two paths another gas may be analyzed etc. That system, of course, requires some type of detector which must come to equilibrium while both paths are in line with the detector before a reliable reading for each gas can be obtained and is, therefore, relatively slow in responding to the presence of a given gas. That system, it appears, could not be adapted to a high speed operation. Also, no provision is made for changes in absorption characteristics of the detectors in the two paths nor is any means provided to compensate for the presence of interfering gases in the system.

A similar dual-path system employing two radiation sources and a differential detector is found in a patent to Munday U.S. Pat. No. 2,741,703, issued Apr. 10, 1956. In addition to having the drawbacks of the Hutchins analyzer this analyzer, by employing two separate sources, has possible variances between the two sources as an additional source of error in readings obtained from that system.

Further prior art reference is contained in Japanese Utility Model Publication No. 4398/1969 published Feb. 18, 1969 and entitled "Multi-Composition Infrared Analyzer." That disclosure describes a multi-component infrared gas analyzer which utilizes a single constant wavelength to provide a reference signal for all the gases of interest for which a sample is to be analyzed. This constant reference signal is compared with signals produced by the absorption from different narrow-bands associated with each gas of interest for which the sample is to be analyzed. Also, that system utilizes mechanical contact points similar to those in an automotive distributor to provide synchronization between the detector signals and the proper amplifying and output device which are subject to dirt and other sources of reduced contact efficiency. Because a constant single wavelength reference system is used which has a different wavelength from that used to analyze for each of the gases of interest in the sample, any of the possible changes in the source or detector output, etc., which affect different wavelengths in different manners affect the reference signal differently from the analysis signal thereby producing unwanted detection errors.

SUMMARY OF THE INVENTION

According to the present invention, there is provided an improved multi-component single path nondispersive infrared analyzer which overcomes problems associated with previous multi-component analyzers. This is accomplished by a unique combination of optical filtering and detection techniques with synchronization and signal processing systems which allow the accurate quantitative determination of the presence of a plurality of gases of interest in a gaseous mixture in a single path single detector system.

The present invention is basically a nondispersive infrared correlation spectrometer which utilizes, in the preferred embodiment, a single radiation path containing the source, a sample cell and detector in combination with a rotating filter wheel which contains a series of filter systems having reference and analysis filters sequentially disposed in ordered pairs, one pair associated with each gas of interest to be analyzed. The reference filter contains a narrow bandpass filter element having a passband centered on a portion of the infrared spectrum wherein the gas of interest to be determined by the corresponding filter system has at least one strong absorption line; and it may contain additional elements including a filter cell filled with a gas transparent to infrared and a filter cell filled with a gas having an infrared absorption spectrum overlapping that of the gas of interest in the passband of the bandpass filter. The analysis filter contains a bandpass filter element having substantially the same passband as that in the reference filter and a sensitizing cell filled with the gas of interest. An additional filter cell element may be provided as in the reference filter to contain a gas having an overlapping absorption spectrum. The rotation of the filter wheel causes the reference and analysis filters to be sequentially disposed between the source and the detector in line with the sample cell such that the reference filtered radiation and the sensitized or analysis filtered radiation for each are sequentially sensed by the detector.

A special synchronization system insures proper synchronization between the rotation of the filter wheel and a signal analysis system connected to the detector. The signal analysis system includes a multi-subchannel electronic system which sequentially compares the detector signals derived from infrared radiation traversing each of the filters of each filter system as the filter rotates allowing a simultaneous quantitative reading of each gas of interest analyzed by the system at a conventional information utilization device. The use of a detector having a rapid response and excellent signal-to-noise ratio, such as a solid state mercury cadmium telluride detector allows the filter wheel to be rotated at a high rate of speed.

BRIEF DESCRIPTION OF THE DRAWINGS

In the drawings wherein like numerals are utilized to represent like parts throughout the same.

DESCRIPTION OF THE PREFERRED EMBODIMENTS

Figure 1:
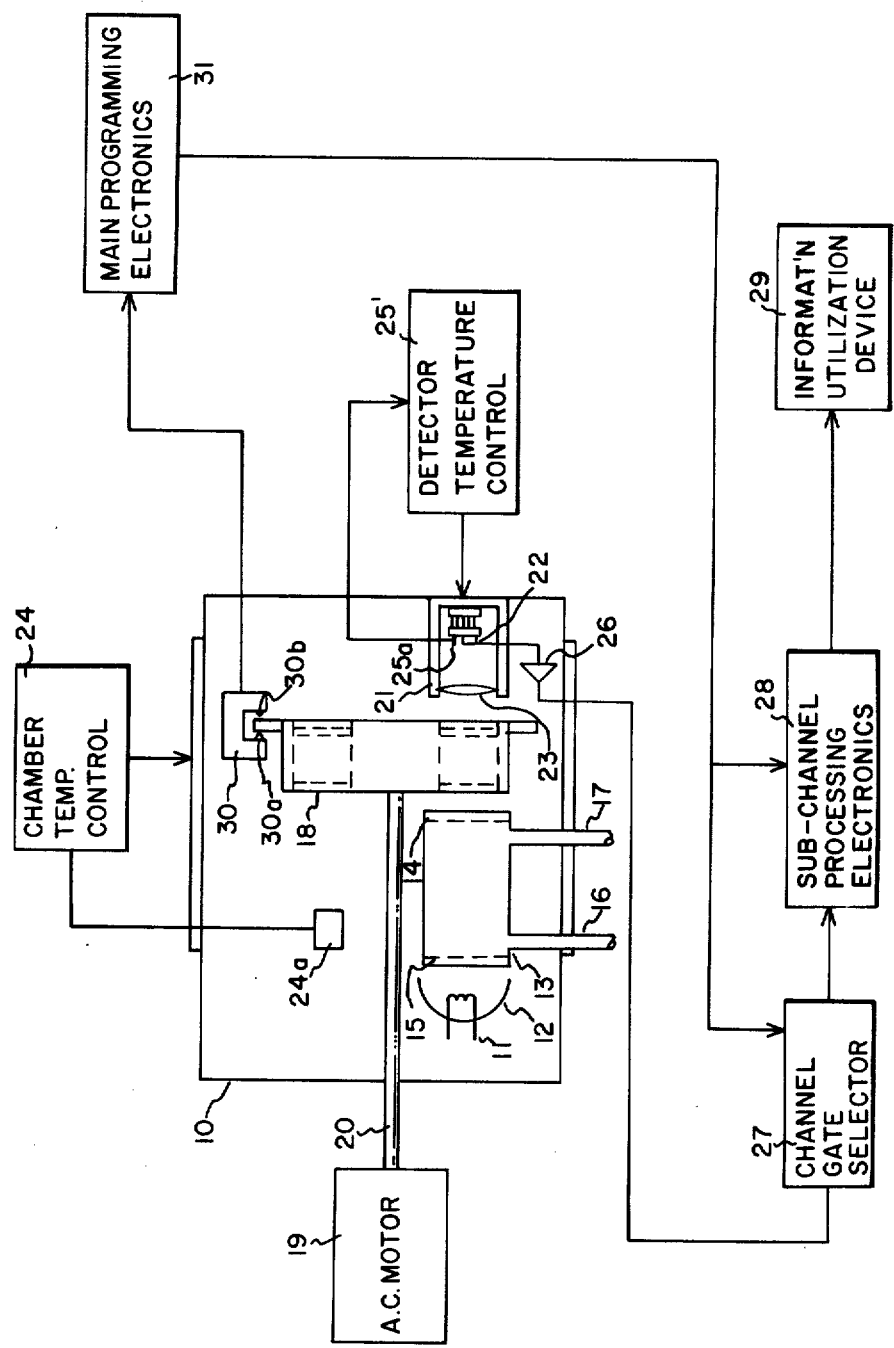
FIG. 1 is a schematic representation of the analyzing instrument of the present invention.

The superiority and success of the nondispersive infrared analyzer of the present invention depends upon the accuracy and close coordination of several sytems. FIG. 1 depicts a preferred embodiment of the analyzer of the present invention in schematic form. In that figure, a housing 10 is provided which may contain the entire optical and all or part of the electronic system of the analyzer. The analyzer is provided with a source of infrared radiation 11 and, as discussed below, depending on the nature of that source, a reflector 12. A sample cell 13 having windows 14 and 15 which are transparent to the passage of infrared radiation and inlet and outlet accesses 16 and 17 is provided for containing the sample of the gas to be analyzed. A filter wheel 18, containing ordered pairs of filtering means as is required for the reference and analysis paths of each of the gases to be analyzed by the instrument is provided. The various components of the filter wheel are discussed below in greater detail. The filter wheel is driven in conjunction with the operation of the analyzer as by an AC motor 19 and drive shaft 20. A detector chamber 21 contains an infrared detector 22 for detecting the infrared radiation transmitted along the path from the source 11 to the detector 22. A lens 23 may be provided to focus the transmitted infrared radiation on the detector 22.

If desired, a chamber temperature control 24 operated in conjunction with a temperature sensor 24a may be used to control the temperature in the analyzer chamber. While temperature control is not strictly required for the operation of the analyzer of the invention, it is desirable to maintain a fairly constant temperature within the chamber as a constant temperature environment enhances the operation of the device. Such control also allows the instrument to be subjected to a wider range of external environmental temperatures. Likewise, a temperature control 25 may be provided to control the temperature of the detector 22 through a temperature sensor 25a. The detector of the preferred embodiment is a solid state device and, as with most other solid state detectors, the detector of the preferred embodiment of the invention produces signals in response to the detection of infrared energy which are somewhat temperature dependent. An increase occurs in the detector signal corresponding to a given intensity of infrared energy detected as the detector temperature is lowered. For example, a signal corresponding to a given percentage of a gas of interest may double in amplitude when the detector is cooled from 25° to 0°C. the signal quantity and quality produced at 25°C in normal applications of the detector of the invention, however, is sufficient to produce good results although cooling may be desired.

In regard to the source of infrared energy 11, that source should be one capable of delivering approximately 1 milliwatt of energy to the detector after accounting for intermediate absorption along the optical path. Success has been obtained using several different kinds of sources which may be provided in combination with a reflector 12. Thus, a large, hot source such as SiC, for example, may be provide without the need for any reflector. A small hot source such as five turns of 0.25 mm diameter Kanthal wire, wound on a 1 mm mandrel, for example, has been used with a crude reflector. A rather large, relatively cool source may also be used, provided that an efficient reflector is provided. Thus, the only requirement of the source is that a sufficient amount of infrared energy be provided commensurate with the detector used and intermediate path losses encountered.

The general requirements for the sample cell are that it have a reasonably small volume, be leak proof, not contain any dead spaces which might lead to difficulties in purging or inaccurate readings, be easily cleaned, and, of course, be inert to the constituents found in the sample. Windows 14 and 15, of course, must pass the wavelengths of infrared radiation which the gases in the sample absorb. A material such as sapphire, for example, meets this transparency requirement quite well. It has been found that the efficiency of infrared transmissions due to the sample cell may be enhanced by coating the inside of the cell, except the windows, with a material with a high reflectivity for infrared radiation. A sample cell having a high reflectance, of course, will transmit a higher percentage of the infrared energy it perceives along the path. This is helpful in reducing the intensity of the source required to operate the instrument of the invention. Thus, metals such as gold, for example, which do have a high infrared reflectance have been used successfully in obtaining this increased transmission. Of course, gas sampling may be accomplished either in an on line continuous mode or in a batchwise fashion.

In certain applications of the analyzer of the invention it may be desired to monitor the environmental gaseous mixture in which the device is placed. Under such circumstances the sample cell will not be necessary and can be eliminated from the system allowing the environmental gas to be analyzed directly.

Detector 22 may be any one of a number of non-selective devices, i.e., devices which respond to a relatively broad band of the infrared spectrum not limited to the spectrum of a particular absorbing component, and which produce an electrical signal in response to the detection of infrared energy. The detector should have its peak sensitivity in the range of the infrared spectrum in which the gases of interest to be analyzed also have a high absorbance. The response of the detector must be relatively rapid and the output produced must have a high signal-to-noise ratio in order for the analyzing instrument to provide a fast and accurate gas analysis. One material meeting all the requirements of such a detector is the material mercury cadmium telluride (Hg,Cd)Te. One type of detector of this material has been found to have a peak response to infrared energy occurring at approximately 4.8 microns but has an excellent response over the entire range of from about 1.0 to above 5.4 microns. This range encompasses the infrared spectrum required to analyze samples for all of the common heteroatomic gases normally sought by such devices, for example, wavelengths include 3.3 microns for $CH_4$, 4.3 microns for $CO_2$ and 4.7 microns for CO. The response time i.e., the time it takes the detector output to build to about 63 per cent of equilibrium value, of the (Hg,Cd)Te detector is relatively rapid (in the order of a few microseconds) and the detector exhibits an excellent signal-to-noise ratio. As discussed above the detector may be cooled, if desired, to enhance the amplitude of a given response output.

Generally, the signal from the infrared detector 22 is conducted through a detector amplifier system 26 (discussed in greater detail below). Such amplified signals are then fed to a channel gate selection system 27 (illustrated in greater detail in FIG. 6) which sequentially selects a subchannel for the signal processing, one subchannel being provided for each gas to be analyzed. The signal is, in turn, fed to the proper subchannel electronic system for that particular gas as at 28 where the signal is further amplified and processed before being fed to an information utilization device 29 which may be a meter or other conventional output display. The electronics will be discussed in greater detail below. Synchronization between the channel gate selection system and the remaining channel processing electronics in relation to the position of the filter wheel 18 is also provided. As also discussed in greater detail below, the synchronization system includes a filter wheel position sensing device. The system 30 may include a light emitting diode 30a and silicon detector optically actuated switch 30b. The system 30 feeds into the main programming electronics 31 which provide the required synchronization.

Figure 3:
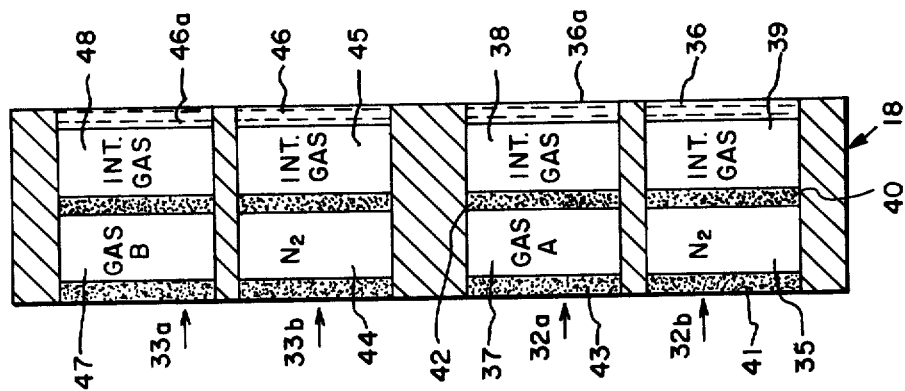
FIG. 3 is a sectional view taken substantially along line 3—3 of FIG. 2.
Figure 2:
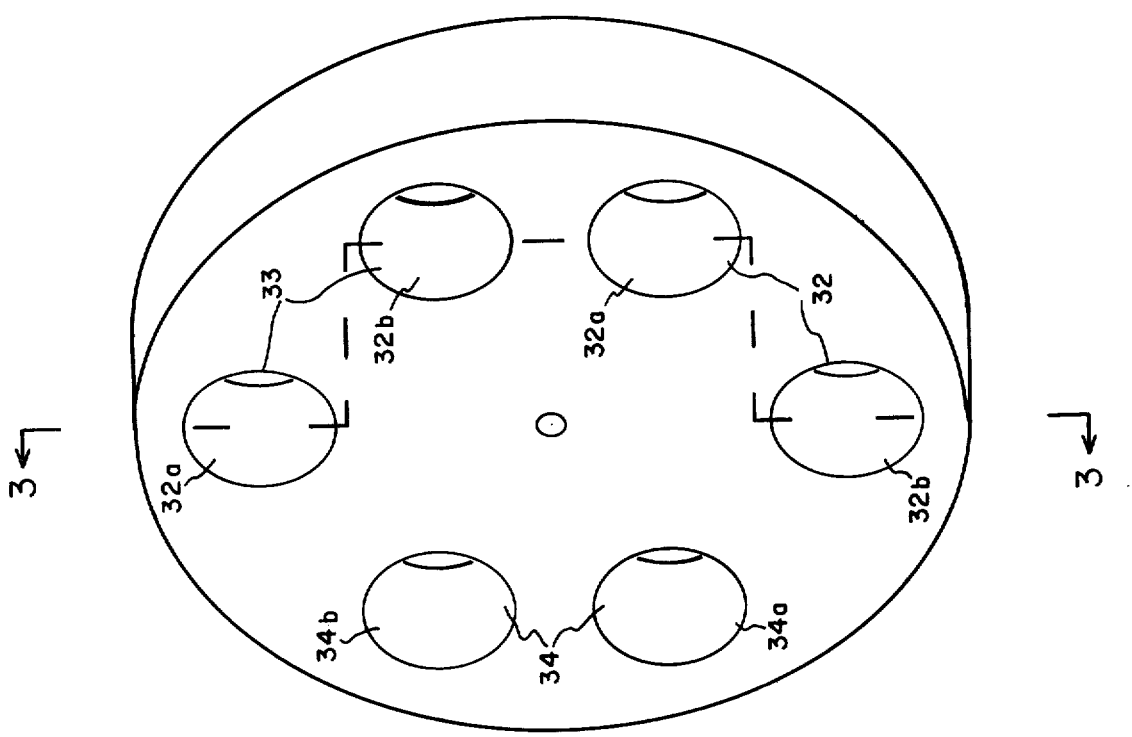
FIG. 2 is a perspective view of the filter wheel of the invention.

The filter wheel of the analyzer of the invention is illustrated in greater detail in FIGS. 2 and 3. FIG. 2 shows an enlarged perspective view of the filter wheel 18 of FIG. 1. The filter wheel is typically in the form of a machined circular disc-shaped member having a plurality of openings therethrough arranged in ordered pairs. Normally the openings are further arranged in a symmetrical radial pattern equi-distant from the center of the filter wheel 18 and from each other. Each pair of the ordered pairs of filters denoted as 32, 33 and 34 in the filter wheel 18 provides a filter system including a reference filter and an analysis filter for the analysis of a given gas of interest. Thus, the ordered pairs of openings and filters which are denoted by 32a and 32b, 33a and 33b, and 34a and 34b. For example, filter system 32 containing openings 32a and 32b may form such a pair designed to analyze the gaseous mixture for a given gas A, system 33, containing openings 33a and 33b for a given gas B, etc. It can be seen in the sectional view of FIG. 3 that each of the filters in the filter wheel 18 may contain a plurality of in-line filter elements.

As previously discussed, the analyzer of the invention is one which electronically compares electrical signals produced by the detection of infrared radiation traversing analysis and reference systems. Thus, as the filter wheel 18 rotates, the openings in the filter wheel are caused to pass sequentially into the path of infrared radiation between the source and the detector, aligned with the sample cell.

If we designate opening 32b as one containing the reference filter for a given gas A this reference filter nromally includes several elements, namely a first cell 35 containing a gas transparent to infrared, for example, nitrogen and a narrow bandpass opitcal filter element 36 which filters out the entire infrared spectrum with the exception of a narrow passband which contains at least one strong absorption line of the particular gas of interest A, to be detected. The analysis filter 32a in a like manner includes several elements, including a first or sensitizing cell 37 filled with the particular gas of interest, in this case, gas A. Filter 32a is also provided with a narrow bandpass optical filter element 36a which passes the same passband of infrared radiation as the narrow bandpass optical filter element 36.

If a further correlation filter is required because of the possible presence of another gas in the sample which has an infrared absorption spectrum overlapping that of the gas of interest in the narrow passband of the narrow bandpass filters, additional filter element chambers as 38 and 39 may be provided in both filters. These are filled with this interfering gas so that its presence in the sample will not affect the detector output signal in either path. Electronic compensation is made for the total energy difference between the reference and analysis systems caused by the absorption in cell 37.

Gastight windows 40 to 43 are provided to maintain the integrity of the gaseous species in the cells. The windows may be made of any gastight material which readily transmits infrared energy. Success has been achieved by utilizing sapphire windows secured in place as by a resin of epichlorohydrin in a well known manner. A similar type resin, of course, can be used to fix the narrow bandpass optical filters 36 and 36a in place. Valves, not shown, may be machined in from the edge of the filter wheel 18 to provide access to and a seal for the plurality of chambers therein.

In similar fashion, the two filters 33a and 33b involved in the analysis of gas B provide an analysis filter and a reference filter respectively for that gas. The reference filter contains infrared-transparent gas cell 44, interfering gas cell 45, if required, and narrow bandpass optical filter 46. The analysis filter contains sensitizing gas cell 47, containing a pure specimen of the gas B, interference gas cell 48, if required, and a narrow bandpass opitcal filter 46a. Of course, the narrow bandpass filters 46 and 46a should be adapted to pass the same narrow passband of the infrared spectrum, namely, one wherein gas B has at least one strong absorption line. This will generally be a different narrow passband from that passed by narrow bandpass filters 36 and 36a.

Again using gas A as an example, as the filter wheel 18 rotates assuming a counterclock rotation, the detector will receive energy transmitted through filters 32a and 32b sequentially. Thus, a beam of infrared radiation passing through the sample chamber 13, sensitizing cell 37, gas filter cell 38 and narrow bandpass filter 36a will be detected by detector 22 during the time that sequence is established by the position of the filter wheel. Subsequently, when opening 32b is placed in the path, the detector will receive infrared energy passing through the sample cell 13, reference cell 35, gas filter cell 39 and narrow bandpass optical filter 36. This sequence of cource repeats for the other optical filtering systems 33 and 34 in the analysis of the other gases of interest. Although the filter wheel pictured in FIGS. 2 and 3 represents one adapted for the analysis of three gases, having three ordered pairs of openings, it can readily be seen how any practical number of gases can be analyzed in a like manner by providing more or fewer numbers of ordered pairs of such openings in the filter wheel.

The quantitative measurement of a gas of interest by the analyzer of the invention is dependent upon a comparison of infrared intensity related output signals produced by a non-selective detector sequentially detecting such light passing alternately through reference and analysis subsystems related to each gas of interest. The difference in intensity is directly related to the absorption of infrared in the reference path by a particular gas of interest in the sample. The use of selected narrow bandpass optical filters which pass a narrow portion of the infrared spectrum to concentrate on the same narrow band for both the reference and analysis filters wherein the gas of interest has at least one strong absorption line reduces the total infrared energy in both systems and enhances the relative difference therebetween when a quantity of the gas of interest is present in the sample. This, of course, increases the quantitative accuracy of the device. Also, enough energy remains in the passband after traversing either filter for accurate detection.

In addition, by concentrating on the same narrow band in both the reference and analysis systems, errors resulting from spectral shifts caused by a change in source output or detector response phenomena are practically eliminated because both systems are equally affected.

The filters, e.g. 38 and 39 (FIG. 3) are generally used only when there exists a gas which may be present in the sample and which has an infrared absorption spectrum overlapping that of the gas of interest within the passband of the corresponding narrow bandpass optical filters, as that gas will also absorb infrared energy and therefore be measured as additional amounts of the gas of interest. If the gas filters are filled with the interfering gas, the absorption by it from both paths eliminates the associated source of error. Of course, if a plurality of gases would interfere, all such gases may be combined in the filter cell to prevent such interference.

In this manner interference by gaseous components in the sample other than the gas of interest is eliminated except for gases which have a fine infrared absorption spectrum directly correlated with that of the gas of interest within the designated narrow band. Fine infrared absorption spectrum is defined as the band of fine absorption line making up each strong absorption line in the broader infrared absorption spectrum of a gas. Thus, the chances of two gases having directly correlated fine absorption spectra within such a narrow band is quite rare; and, if proper selection of the narrow band optical filters is made in conjunction with the gas of interest to be detected with the possible exception of certain overlapping hydrocarbons, this phenomena should not present a problem.

In applications where this is not a problem, the filters for containing the interfering gas may be eliminated or filled with a transparent gas. Also, with regard to be filters containing nitrogen, in some cases, an evacuated transparent cell may be used.

Another advantage of the analyzer of the present invention lies in the manner of utilizing the detector output to achieve a readout based upon a true ratio system rather than a difference system. The decrease in the intensity of the infrared radiation traversing both the reference and analysis systems may be approximated by Beer's Law as follows:

$$I_r = I_{oe}^{-kl C_r}$$
$$I_a = I_{oe}^{-kl C_a}$$

where $I_0$ = Source intensity
$I_r$ = Intensity of radiation traversing the reference system
$I_a$ = Intensity of radiation traversing the analysis system
$k$ = Absorption coefficient $l$ = Path length $C_r$, $C_a$ = Concentration of gas of interest in the mixture From the above it is easy to see that if a measure of the difference in the signals is used we obtain $$I_a - I_r = I_o (e^{-klC}a - \bar{e}^{klC}r)$$

It can be seen from the above that the difference is affected by changes in the value of $I_o$. If, however, we use a true ratio the value such as 1 −

$$1 - \left(\frac{I_a - I_r}{I_a}\right)$$

we obtain $$1 - \left(\frac{I_a - I_r}{I_a}\right) = e^{-kl(C_a - C_r)}$$

which is no longer affected by changes in the source intensity $I_o$.

It can similarly be shown that changes in the detector response output will not affect the above ratio, although that requires a more complicated analysis and is not illustrated.

Figures 4, 4A:
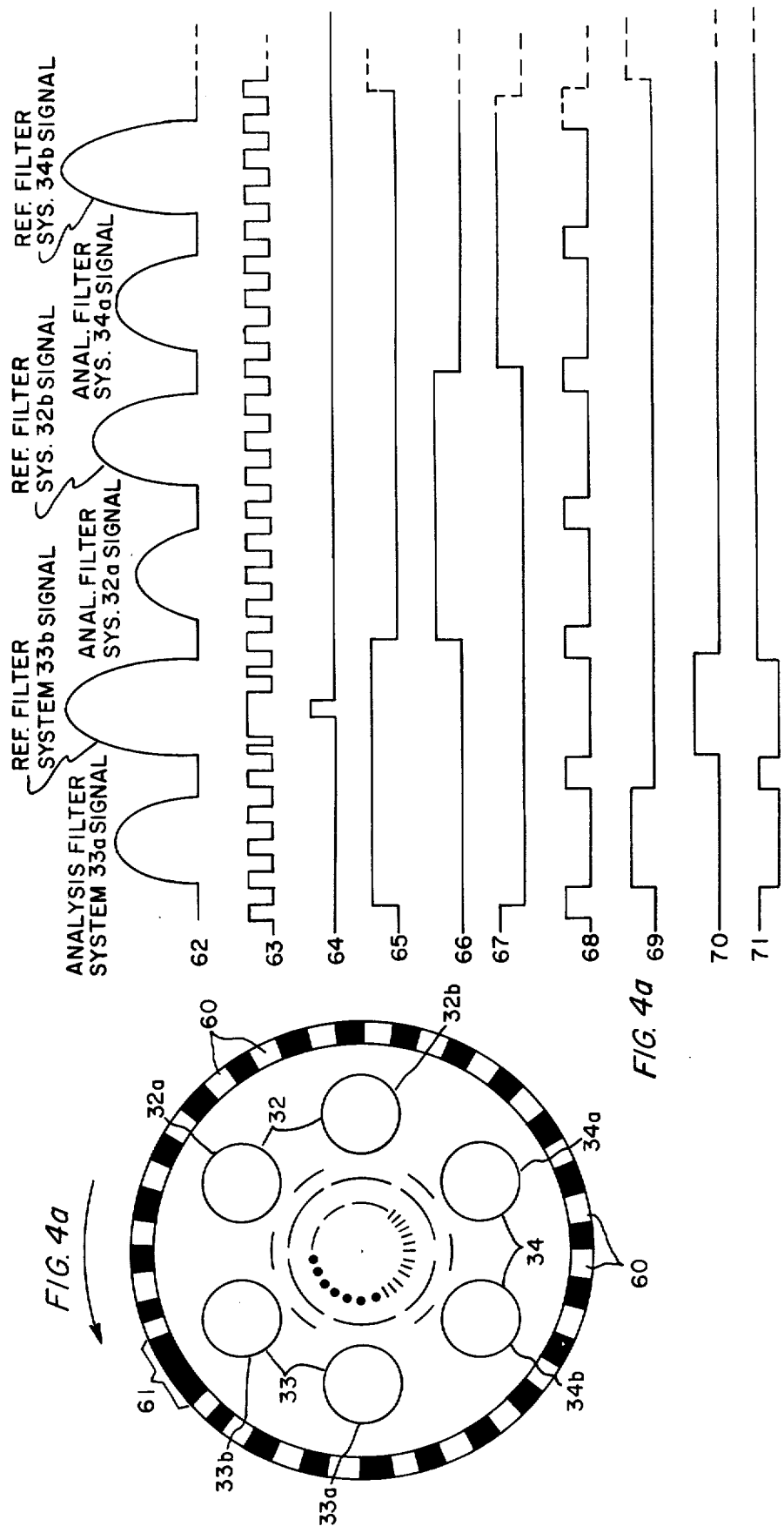
FIG. 4 shows the programming detail of the filter wheel of FIG. 1.
FIG. 4a is a timing logic diagram showing the programming signals of the invention associated with FIG. 4.

The timing diagram for proper coordination position of the filter wheel and detector signals are depicted in FIGS. 4 and 4a. A row of openings 60 are, with the exception of one area of asymmetry having a pair of openings 61, evenly spaced about the circumference of the outer edge of the filter wheel 18. These openings operate in conjunction with the filter wheel position sensing device. This includes a source, which may be a light emitting diode 30a (FIG. 1) and an optically actuated switch 30b (also shown in FIG. 1) to derive a synchronizing signal to synchronize the channel gate selection system 27 and remaining channel processing electronics with the rotation of the filter wheel 18.

In one embodiment, it has been found that sufficient resolution of the angular position of the filter wheel 18 versus time is provided by having eight openings and spacings per filter system. This provides eight pulses in the time duration during which a filter system passes through the radiation beam provided by source 11. Hence, there are eight openings and spacings associated with filter system 32, eight openings and spacings associated with filter system 33 and finally, there are eight openings and spacings associated with filter systems 34 as shown in FIG. 4. The openings 60 are symmetrically placed along the periphery of the filter wheel 18, except for the openings 61 located by reference filter 33b. The asymmetry in the geometrical arrangement of openings 61 provides a reference angular position on the circumference of the filter wheel 18 and also results in an asymmetry in the synchronizing signal obtained from the openings 60 and 61 by use of the optical switch 30 therewith. The asymmetry in the synchronizing signal provides a reference point in time corresponding to the reference angular position on filter wheel 18 which, as stated, is at the position of reference filter 33b.

The optical switch 30 and the electronics following it provide the synchronizing signal 63 shown in FIG. 4a with FIG. 4a drawn assuming filter wheel 18 has reached a relatively steady rate of rotation. The electronics following the optical switch 30 amplify the output of the optical switch and then clip this output in providing synchronizing signal 63. Synchronizing signal 63 is shown in FIG. 4a in its low level state when one of the openings 60 is located between the light emitting diode 30a and phototransistor 30b, which are the radiation transmitting and receiving elements in optical switch 30. When one of the spacings between the openings 60 prevents the light from light emitting diode 30a from reaching phototransistor 30b, signal 63 is in the high level state.

Figure 5:
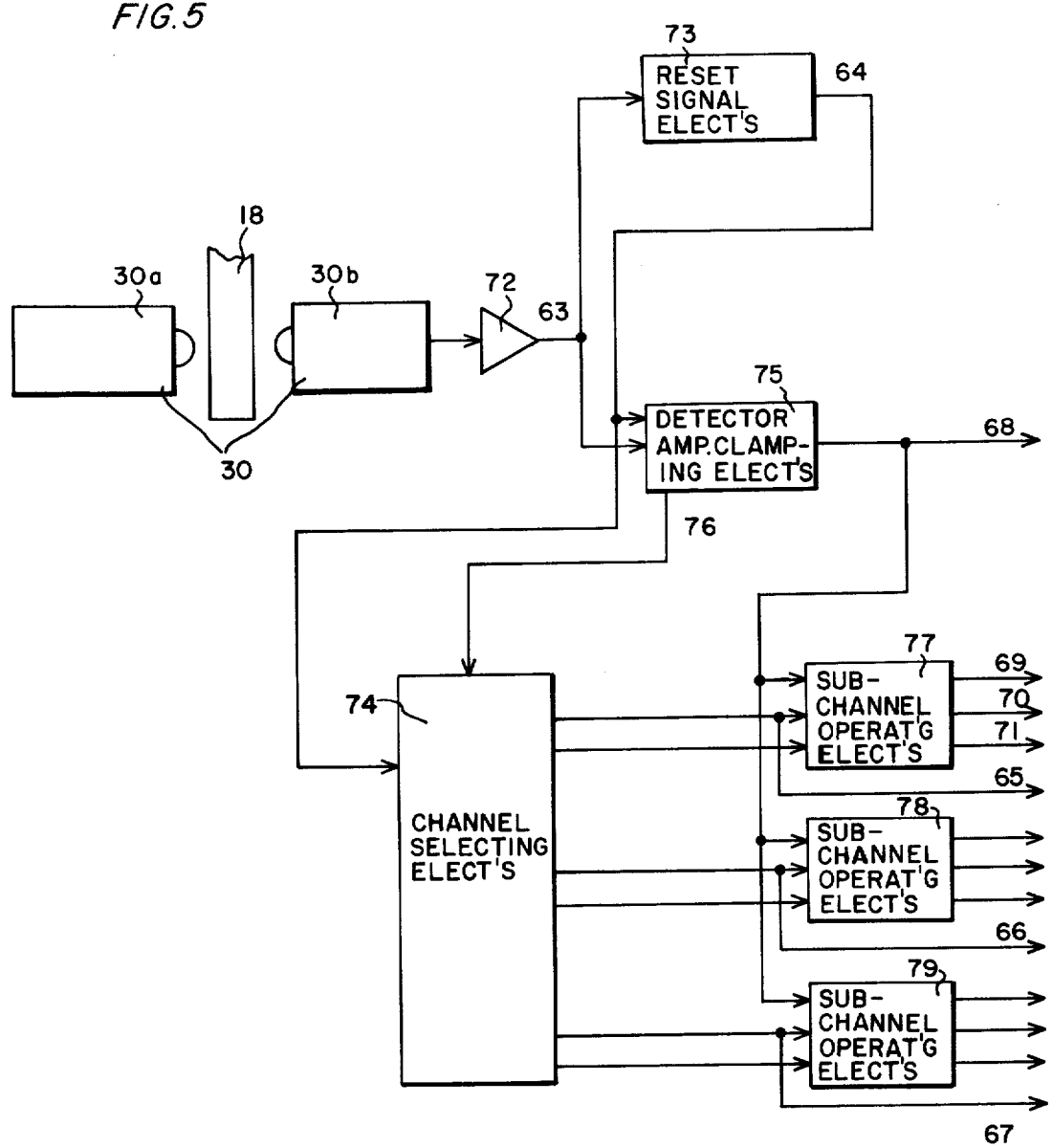
FIG. 5 is a diagram of the programming electronics for the system of the invention.

FIG. 5 shows a block diagram of the system programming electronics. The optical switch 30 and filter wheel 18 are shown therein, followed by amplifier and clipping electronics 72. The location of synchronizing signal 63 at the output of these electronics is marked in this figure.

Figure 6:
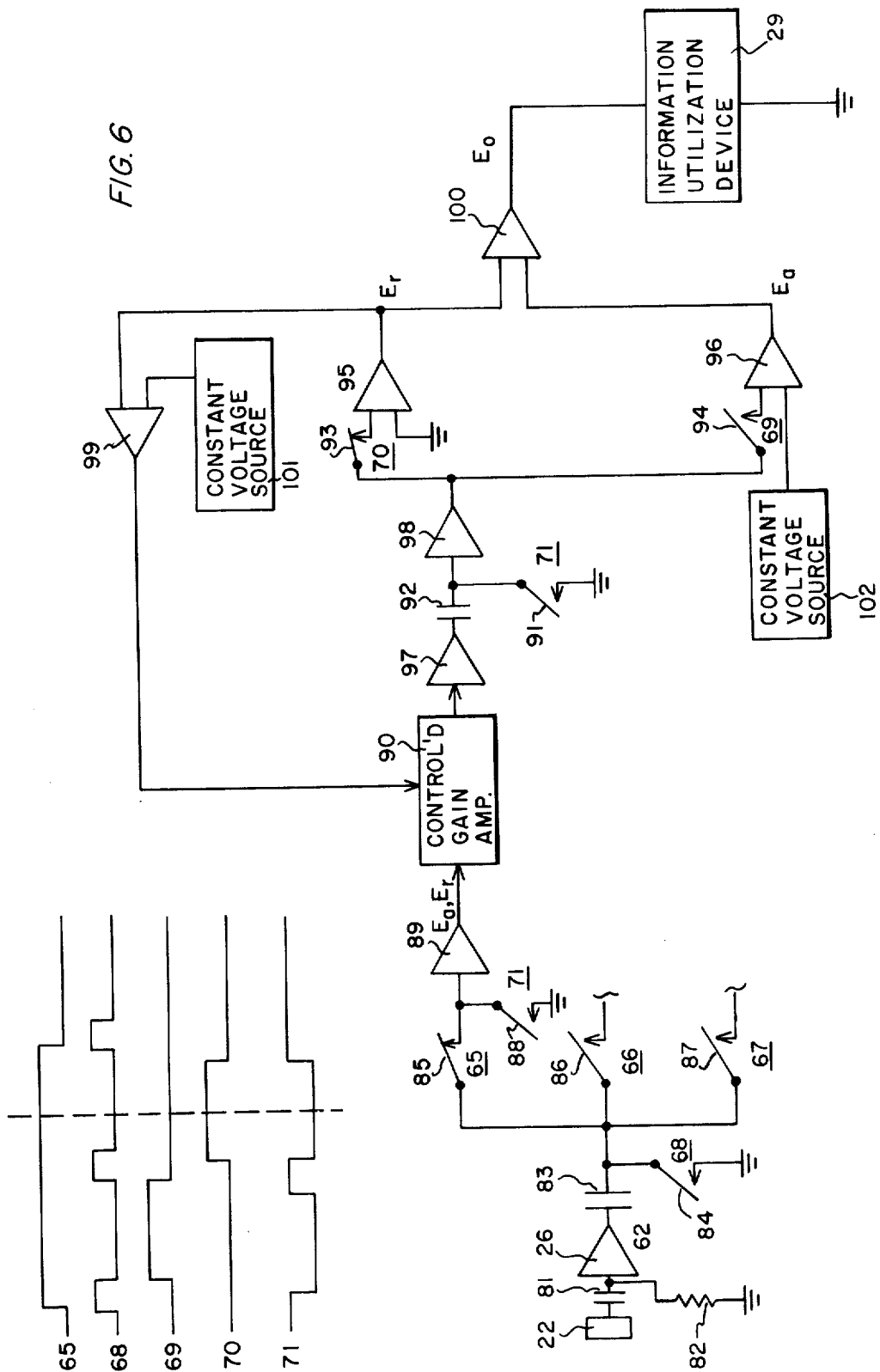
FIG. 6 is a block diagram of the channel electronics corresponding to analysis of one gas of interest.

Shown above synchronizing signal 63 in FIG. 4a is the amplified and filtered output signal of detector 22 for one revolution of filter wheel 18. The amplified and filtered detector signal 62 is shown somewhat idealized for simplicity and with arbitrary relative magnitudes between the shown signal lobes in signal 62 which are due to the radiation pulse transmitted to detector 22 through each analysis and reference filter. The signal lobes are designated to indicate the analysis or reference filter with which it corresponds in FIG. 4a. The passing of a radiation pulse to the detector 22, which results in a signal lobe in signal 62, becomes possible during the time the corresponding analysis or reference filter is in line between the radiation source 11 and the detector 22. FIG. 6 is a block diagram of part of the channel electronics and the location of signal 62 is marked therein. A discussion of the block diagram of the channel electronics shown in FIG. 6 will be found below.

Several other signals in the system are derived from the basic system synchronizing signal 63. Some of these are set out in the remainder of FIG. 4a. The first of these signals derived is the programming electronics reset signal 64. The asymmetry in the synchronizing signal 63, shown below the reference filter 33b signal lobe in signal 62 as discussed above which is caused by the asymmetrical location and size of openings 61, is the basis of obtaining reset signal 64 from synchronizing signal 63.

The time duration during which each spacing between openings 60 blocks the transmission of light from light emitting diode 30a to phototransistor 30b is measured by electronics shown in block 73 of FIG. 5. The only signal 63 high state duration which is sufficiently long to cause the electronics in block 73 of FIG. 5 to provide an output pulse is that due to the increased spacing between openings 61. Signal 64, as is shown in FIG. 4a, has a pulse occurring during this asymmetrically long time duration in which synchronizing signal 63 is in the high state.

The reset pulse in reset signal 64 has been chosen to be provided during the time duration that a signal is being received due to radiation passing through reference filter 33b because, at this time, no other switching is required in either the programming electronics or in the channel electronics. Any noise developed in producing signal 64 thereby has a minimal effect as result of this choice.

Referring to FIG. 5, signal 64 is shown at the output of block 73 containing the reset signal electronics. The reset pulse is used to provide a reset signal to all of the memory elements appearing in the remainder of the programming electronics. The memory elements will usually be in the proper state at this time although, on occasion, a noise pulse may cause an error in a memory element state. This resetting of memory elements is indicated by the signal path from the block 73 output to the other programming electronics blocks having memory elements provided in them.

Any error in the programming electronics due to logic switching noise or to logic line pick-up noise cannot persist beyond the time that the filter has traveled sufficiently far for another reset signal pulse to be generated because the programming electronics are reset to the proper state at that time if there is an error. The programming electronics start from the same preselected electronic state with each cycle of the filter wheel 18 after the reset signal pulse is generated. This means, in effect, that it is assured that the programming electronics begin anew with each reset pulse provided in reset signal 64. The result is that the rotation of filter wheel 18 is the fundamental timing base or clocking for the operation of the programming electronics. The programming electronics are thereby closely coordinated with the position of filter wheel 18.

The remaining signals shown in FIG. 4, signals 65 through 71, are all used to control and to operate the channel electronics which are shown in block diagram form in FIG. 6. All these signals serve to control and operate the channel electronics at points in the channel electronics signal paths beyond the point where detector amplifier signal 62 is provided. Therefore, the effects of signals 65 through 71 on the channel electronics will not change detector amplifier signal 62 from what is shown in FIG. 4a for the output of the detector amplifier, but will operate on signal 62 at later points in the channel electronics.

It will be remembered that radiation detector 22 provides an output signal representative of the successive outputs of each of the reference and analysis filters located in filter wheel 18. The signal from detector 22 is then filtered and amplified and becomes detector amplifier signal 62 at the output of the detector amplifier 26 as shown in FIG. 6. Signal 62 is then capacitively coupled by capacitor 83 to one side of three transmitting switches 85, 86 and 87. Before these switches then, the outputs of each of the analysis and reference filter systems, as measured by detector 22, are signals multiplexed in time as is discussed in more detail below. The three transmitting switches 85, 86 and 87 then act as demultiplexers on a channel or filter system basis by directing signals representing the output of an analysis filter and the output of its corresponding and successive reference filter into one of the three electronic subchannels following the transmitting switches. As an example, the two signal lobes associated with filter system 33 are directed by transmitting switch 85 to buffer amplifier 89 at the beginning of the subchannel electronics also associated with filter system 33. It follows from FIG. 6 that for each gas of interest, an analysis for that gas is provided by a single filter system associated with the electronics of a single subchannel.

Returning now to FIG. 4a, the signals 65 through 67 are the signals used to control the transmitting gates 85, 86 and 87 of FIG. 6. Since one of these three signals is always in the high level state as seen in FIG. 4a, signal 62 is always applied to one of the subchannels since a transmitting switch closes when its control signal is in the high level state.

The points at which the signals 65 through 67 are found in the programming electronics are marked in FIG. 5. FIG. 5 shows that signals 65 through 67 are provided by the channel selecting electronics of block 74. The channel selecting electronics 74 are based on a ring counter which has a count position for each subchannel provided. Other kinds of selection apparatus can be used. As is shown by the three transmitting switches in FIG. 6, switches 85, 86 and 87, and by the three pairs of analysis and reference filters located in filter wheel 18, filter systems 32, 33 and 34, three subchannels have been provided in this embodiment to analyze the presence of three gases of interest. There is no inherent reason why a number greater or smaller than three subchannels could not have been provided by increasing or decreasing the number of count positions in the ring counter and the number of filter systems in filter wheel 18 including the corresponding openings 60. Hence, a system to analyze more or fewer than three gases of interest could be provided without substantial change in the system design.

The ring counter in the channel selecting electronics 74 has a count, here a high level output, stepped around each count position therein to select successively the subchannel into which detector amplifier signal 62 will be directed. This, as indicated above, causes one of the signals 65 through 67 to always be in the high level state corresponding to the closing of one of the transmitting switches 85, 86 or 87 of FIG. 6. It can be seen that the time duration in which one of the signals 65 through 67 is in the high level state just a little more than spans the time duration in which there occurs a signal lobe of an analysis filter system signal and a successive signal lobe of the corresponding reference filter system in signal 62. Therefore, the signals associated with analyzing the presence of one gas of interest, the analysis filter system signal and its corresponding reference filter system signal, are directed into one subchannel corresponding to the gas of interest as indicated above.

The stepping around of the count to the various count positions in the ring counter in channel selecting electronics 74 is controlled by a derived synchronizing signal 76 obtained from detector amplifier clamping electronics 75, shown in FIG. 5. The detector amplifier clamping electronics 75 are in turn controlled by the basic system synchronizing signal 63. Even though signal 76 would be sufficient to continuously circulate the count around the ring counter, reset signal 64 is also applied to the ring counter to reset, if necessary, the memory elements contained therein, as described above, to assure that the counter starts anew with each rotation of the filter wheel 18. Reset signal 64 also resets the other memory elements in the channel selecting electronics 74 all of which may be, for instance, D type flip-flops which are commercially available.

Returning to FIG. 6, coupling capacitor 83 may be charged by the voltage of one of the signal lobes contained in detector amplifier signal 62 (see FIG. 4a). If any of the charging due to this signal lobe remains on coupling capacitor 83, the voltage due to it will be added to the next signal lobe voltage as it is coupled to the transmitting switches 85, 86 and 87 causing an error in this next signal lobe as coupled. To prevent this error, clamping switch 84 to ground is provided to discharge coupling capacitor 83 between occurrences of signal lobes in detector amplifier signal 62. Switch 84 is controlled by signal 68 of FIG. 4a. FIG. 6 is correspondingly marked by having underlined number 68 placed next to clamping switch 84 to show this control.

FIG. 4a shows clamping signal 68 in the high state between each signal lobe of signal 62 due to an analysis or reference filter system signal. The detector amplifier 80 has a low output impedance and so the time that signal 68 is in the high state is sufficient to discharge coupling capacitor 83 through clamping switch 84 before a subsequent signal lobe begins.

Turning to FIG. 5, one sees that clamping signal 68 is obtained from the detector amplifier clamping electronics of block 75. These electronics are controlled by the basic system synchronizing signal 63 which thereby becomes the source of signal 68. Once again, the memory elements in detector amplifier clamping electronics 75 are reset, if necessary, by reset signal 64 so that it is assured the signals generated in detector amplifier clamping electronics 75 restart with each rotation of filter wheel 18. The memory elements for detector amplifier clamping electronics 75 may again be D type flip-flops.

It may also be noted from FIG. 4a that clamping switch 84, in closing between the signal lobes of signal 62, is also closed during the times that transmitting switches 85, 86 or 87 are switching in response to level shifts in the signals 65 through 67. This is provided to keep any transients due to the switching of the transmitting switches from affecting the electronics ahead of clamping switch 84.

The remaining signals in FIG. 4a, signals 69 through 71, control the operation of the electronics in the subchannel involved with processing the signal lobes due to filter system 33 to analyze the gas sample for the gas of interest associated therewith. The electronics for this subchannel are shown in block diagram form in FIG. 6. Signals 69 through 71 are obtained from block 77 in FIG. 5 which is one of three sets of subchannel operating electronics shown therein.

Subchannel operating electronics 78 provides three more signals which are the same as signals 69 through 71 of FIG. 4a, except as displaced in time (to the right in FIG. 4a) by the amount of time that the signals for filter system 32 are displaced in time from the signals for filter system 33 in signal 62. Thus, the signals provided by subchannel operating electronics 78 would bear the same relationship to the signals from filter system 32 in signal 62 that the signals from subchannel operating electronics 77 bears to the filter system 33 signals in signal 62.

Similarly, a corresponding set of signals is provided by subchannel operating electronics 79 for the signals of filter system 34. The signals from subchannel operating electronics 78 and 79 are not shown in FIG. 4a since their explanation would be but a repetition of the explanation of the signals 69 through 71 provided by subchannel operating electronics 77. The subchannel operating electronics beyond transmitting switches 86 and 87 are not shown in FIG. 6 either, as their operation is the same as the subchannel electronics beyond transmitting switch 85.

The demultiplexing on a channel or filter system basis was described above as being performed by the transmitting switches 85, 86 and 87. Transmitting switch 85 provides signals from filter system 33 to the subchannel electronics shown in FIG. 6. However, the signal from analysis filter 33a must be separated or demultiplexed from the signal of reference filter 33b in the subchannel electronics. This is done by closing transmitting switch 93 in a first interval to transmit the signal from analysis filter 33a, as modified by the electronics preceeding transmitting switch 93, to low pass amplifier 95. Transmitting switch 94, which is open during the time transmitting switch 93 is closed, directs the now modified signal from reference filter 33b to low pass amplifier 96 when it is closed in a second an alternate interval. These two transmitting switches, 93 and 94, are controlled by signals 69 and 70, as marked in FIG. 6 and shown in FIG. 4a. FIG. 4a also shows that both signals 69 and 70 are alternately in the high state only during the time that signal 65, which controls transmitting switch 85, is in the high state, i.e., during the time that the subchannel for filter system 33 is selected. This is the required coordination between transmitting switches 93 and 94 used for subchannel demultiplexing and the transmitting switch 85 used for subchannel selection or channel demultiplexing.

Two further switches, 88 and 91, are shown in FIG. 6. These are both clamping switches. Clamping switch 88 is used to ground the front end of the subchannel electronics when no signal from detector amplifier 26 is to be applied to the subchannel. This is to eliminate noise pick-up in the subchannel. Th clamping switch 91 serves the same function as clamping switch 84, i.e. to eliminate signal charging on coupling capacitor 92.

All the switches shown in FIG. 6 close when the corresponding control signal is in the high level state. All of the switches shown in FIG. 6 can be satisfactorily provided by bilateral switches constructed by complementary MOS techniques.

Clamping switches 88 and 91 of FIG. 6 are controlled by signal 71 of FIG. 4a. Signal 71 is shown in the high state at all times that signal 68 (discussed above) is in the high state (as well as at certain other times) so switches 88 and 91 act as clamps in the subchannel electronics during the time transmitting switch 85, as controlled by signal 65, is switching. This operation of switches 88 and 91 lessens noise in the subchannel electronics. Switches 88 and 91 also clamp the subchannel electronics during times when the other subchannels are receiving signals through transmitting switches 86 and 87, again to lessen noise.

All three of the signals, 69 through 71, are obtained from the subchannel operating electronics 77 as is marked in FIG. 5. The subchannel operating electronics in blocks 77, 78 and 79 may all be constructed of standard digital logic gating circuits. They all are controlled by the detector amplifier clamping signal 68 and by signals provided by the channel selecting electronics 74. The signals 69 through 71 and their counterparts provided by the subchannel operating electronics 78 and 79 are thereby all derived from these last mentioned signals.

In accord with the above discussion and from a review of the block diagram of FIG. 5, the programming electronics are seen to be operated on the basis of the angular position of filter wheel 18 and are coordinated in operation with that angular position. Several control or programming signals are obtained by the programming electronics of FIG. 5 from the basic system synchronizing signal 63 to operate the channel electronics shown in FIG. 6 as has been indicated. The functional blocks shown in FIG. 6 then respond to the switches controlled by these programming or control signals to process the signal provided by detector 22 in response to infrared radiation from source 11 as modified by passing through the filter systems of filter wheel 18.

Operation of the channel electronics as shown in FIG. 6 can be understood by first considering the interaction between detector 22 and filter wheel 18, the latter not shown in FIG. 6. The detector 22 and the filter wheel 18 act together as a filtering radiation sampler to sample the radiation passed through the gas sample cell 13 and they also act together as a multiplexer to multiplex the radiation samples in time. The detector further acts to transform the radiation samples into an electrical output signal having pulse amplitudes proportional to the radiation intensity included in the samples. The infrared radiation provided by source 11 may be thought of as a beam containing a broad band of wavelengths which passes through a time-varying filter or a changeable attenuator, i.e., varying or changing with the composition of the sample in gas sample cell 13.

This modulated signal beam of radiation is then alternately blocked and transmitted by filter wheel 18 and its filters. As previously discussed, these filters, the analysis filters and the reference filters, further modulate the beam by acting as fixed wavelength filters. The filter wheel 18, by passing the radiation beam through a continuous succession of these fixed wavelength filters and by blocking the beam between successive fixed wavelength filters, in conjunction with the detector 22, provide a repeating succession of signal lobes in time in the electrical output signal at the output of detector 22. One signal lobe is associated with each analysis or reference filter. Each such signal lobe represents a sample of the radiation beam at a point in time as modulated by the gas in the sample cell 13 and as modulated by the analysis or reference filter. Each successive lobe is associated with a different fixed wavelength filter and so associated with a different and independent filtered signal with the result that the signal lobes are time multiplexed samples of as many different signals as there are fixed filters in the filter wheel. This succession of signal lobes at the output of detector 22 is coupled into detector amplifier 80, shown in FIG. 6. The resulting signal is shown as signal 62 of FIG. 4a, the output signal of detector amplifier 26.

Such a mode of operation imposes several requirements on detector 22. As noted above, the apparatus of the present invention can analyze gas samples in sample cell 13 that are either continuously circulated through sample cell 13 or are introduced batchwise into sample cell 13. If the composition of the gas sample in sample cell 13 is continually changing, the sample acts as a time-varying filter to modulate, in a sense, the beam of infrared radiation from source 11. There is then required a sufficient bandwidth in the detector output response (electrical output signal) for the detector to adequately convey the information contained in the modulated radiation beam as to the changing gas sample composition. Batchwise changes of the gas sample in sample cell 13 alter the radiation beam in a constant manner for the entire time that the batch is in the sample cell and so the gas sample acts as a constant attenuator changed only by changing samples. Again, a detector output response of sufficient bandwidth is required to adequately convey the information contained in the radiation beam.

The detector output signal has lobes of frequencies of small to negligible bandwidth centered on the sampling frequency and on each of its harmonics and on its subharmonics down to the frequency of rotation of the filter wheel. This sampling frequency is the frequency of rotation of the filter wheel, about 47 hertz in the present invention, multiplied by the number of analysis and reference filters in the wheel, shown to be six in FIG. 4a. A sufficient detector output response bandwidth includes many of these harmonics.

This bandwidth requirement means that detector 22 must respond with a response time constant that must be much less than the reciprocal of the sampling rate. This bandwidth requirement also requires that the noise contributions from detector 22 must be small enough across this frequency band for a useable output response to be obtained.

As discussed above, mercury cadmium telluride, (Hg,Cd)Te, has been found to form a suitable detector material when in a form that has a response at wavelengths up to 5.4 microns though this is not the only suitable form. To aid in reducing the amount of noise introduced into the system by detector 22, the detector in the present system is temperature controlled though for some applications it need not be.

Turning now to a discussion of the channel electronics beyond detector 22, refer again to FIG. 6. The detector output is coupled into the input of detector amplifier 26 by coupling capacitor 81 which forms a high pass network with resistor 82 as is shown in FIG. 6. Coupling capacitors 81 and 83 are used for stability reasons in view of the high gain of detector amplifier 26. As discussed above, clamping switch 84 removes any signal charging of coupling capacitor 83 which occurred in coupling a signal lobe in signal 62 to the following transmitting switches.

It is desirable in some circumstances to have the electronics before clamping switch 84 remotely located with respect to clamping switch 84 and the remainder of the channel electronics. Providing a sharp switching signal at such a remote location to operate clamping switch for discharging coupling capacitor 81 is difficult and so no clamping switch is shown to discharge coupling capacitor 81 between signal lobes of signal 62 although one could be used in other circumstances. The high pass network of the coupling capacitor 81 and resistor 82 is chosen to have a high time constant to minimize signal charging.

A portion of some of the signals of FIG. 4a is shown in the upper left hand corner of FIG. 6. Again, note that the signals which control the switches are written next to them in underlined numbers corresponding to signal numbering in FIG. 4a. The vertical dashed line across the signal portions shown in FIG. 6 gives a point in time where the switches are in the positions shown in FIG. 6. The functions of clamping switch 84 as operated by signal 68 and transmitting switches 85 through 87 as operated by signals 65 through 67 have been discussed above. It will be remembered that transmitting switches 85 through 87 perform a demultiplexing function on a channel or filter system basis, that is they direct the successive signal lobes in signal 62 from an analysis filter and its corresponding reference filter into the corresponding subchannel to the right of the pertinent transmitting switch. Clamping switch 88 operated by signal 71 was also discussed above.

As shown in FIG. 6, transmitting switch 85 is closed to provide signal lobes from filter system 33 to buffer amplifier 89, these signal lobes being two filtered samples taken from the radiation beam for the purpose of providing an analysis of the gas of interest in the sample cell 13 associated with filter system 33. Specifically, shown in FIG. 6 is the situation in time where the signal from reference filter 33b is applied to buffer amplifier 89.

The functions of the switches to the right of controlled-gain amplifier 90 have also been set out above. It will be remembered that clamping switch 91 as operated by signal 71 removes any signal charging occurring on coupling capacitor 92. Transmitting switches 93 and 94 serve as a demultiplexer to separate the signal due to analysis filter 33a from the signal due to the corresponding reference filter 33b. Despite this intervening switching, a useful system gain can be defined from the output of buffer amplifier 89 to the output of low-pass amplifier 95 and again from the output of buffer amplifier 89 to the output of low-pass amplifier 96.

The signal due to analysis filter 33a may be designated $e_{a\text{-}avg}$ for the effective values of the signal lobes $e_a$ which together over time make up this signal as it appears at the output of buffer amplifier 89. Similarly, let the effective values of signal lobes $e_r$ due to reference filter 33b be designated $e_{r\text{-}avg}$ as they appear at the output of buffer amplifier 89. Again, the voltage output of low-pass amplifier 95 may be designated $E_r$ and the voltage output of low-pass amplifier 96 may be designated $E_a$. Then the following gains may be defined (ignoring constant voltage source 102 for the present):

$$G_1 = \frac{E_r}{e_{r\text{-}avg}}, \quad G_2 = \frac{E_a}{e_{a\text{-}avg}}$$

The low pass amplifiers, 95 and 96, serve to recover the signal information from the sampled data signals, $e_r$ and $e_a$ as modified by elements 90, 92, 97 and 98, by filtering out the sampling frequency and its harmonics. Low pass filters 95 and 96 also serve as averaging filters to average towards zero unwanted noise corrupting the signals applied to the inputs of these filters (hence the designations $e_{r\text{-}avg}$ and $e_{a\text{-}avg}$). This is so because the periodic signal lobes of signal 62 of FIG. 4a corresponding to a particular low-pass amplifier (one lobe per filter wheel revolution), as modified by elements 89, 90, 92, 97 and 98, are repeated at the input of that low-pass amplifier several times between any significant changes in these periodic signal lobes as filter wheel 18 and detector 22 continually sample the radiation beam. The wanted signal portions of the signal lobes as modified, which are repeated once during every revolution of the filter wheel at the inputs of each low-pass amplifier as stated, are strongly correlated with one another while the noise portions of the signal lobes are not correlated. Thus, over several repetitions of these modified signal lobes at the input of the corresponding low-pass amplifier, the wanted signal portions of the modified signal lobes are reinforced while the noise portions tend to cancel and average to zero.

Returning now to the output of buffer amplifier 89, signals $e_a$ and $e_r$ are applied to a closed loop electronic network which provides signals to output amplifier 100 driving a display, or perhaps an information storage and/or processing device, as information utilization device 29. This closed loop electronic network provides an output signal that is proportional to a true ratio of the effective input signals, $e_{a\text{-}avg}$ and $e_{r\text{-}avg}$. In systems where there are effects which alter the gains of components common to the amplification of both signals, taking the ratio between the two signals will eliminate effects of the common alteration. In many systems gains can be well stabilized so that effects common to two signal paths which alter signals do so primarily by causing an additive alteration which can be eliminated by other means such as taking a difference between the signals on these paths. However, in some systems gain altering effects cannot be avoided easily if at all.

Such is the case in the present system where changes in light transmission along the optical paths are manifested as a change in system gains. A change in transmission along the optical path might occur over time, as an example, as a residue accumulates on the sample cell windows due to contaminents coming into contact with these windows. This is the most likely change expected to occur along the optical paths. As a result, an output which is proportional to the ratio of the signals $e_{a\text{-}avg}$ and $e_{r\text{-}avg}$ is desirable to eliminate gain changing common mode effects occurring in this system.

The closed loop electronic network begins to the right of buffer amplifier 89 in FIG. 6 with a controlled-gain amplifier 90. The other components in the common and direct portion of the loop are fixed-gain amplifier 97, coupling capacitor 92 and buffer amplifier 98. The controlled-gain amplifier 90 provides a gain which varies with the voltage applied from the output of integrating amplifier 99. Fixed-gain amplifier 97 provides an AC gain which is coupled by coupling capacitor 92 into buffer amplifier 98. The output of buffer amplifier 98 is provided to transmitting switches 93 and 94 which control the application of signals to low-pass amplifiers 95 and 96, respectively. The outputs of these low-pass amplifiers, $E_r$ and $E_a$, are applied as inputs to output amplifier 100 which provides an output proportional to the difference between $E_r$ and $E_a$. These low-pass amplifiers have individual gains relating the output of each to the average of the imputs applied to each. These gains are $G_r$ and $G_e$ respectively.

Signal $E_r$ is also applied to the input of integrating amplifier 99 which provides a control signal for controlled-gain amplifier 90. The action of this feedback loop containing integrating amplifier 99 acts to control the gain of controlled-gain amplifier 90 in such a manner as to tend to keep signal $E_r$ equal to the constant voltage supplied by constant voltage source 101. In this situation, gain $G_1$ becomes:

$$G_1 = \frac{E_{r\text{-}const}}{e_{r\text{-}avg}}$$

The gains of low-pass amplifiers 95 and 96 are set to be approximately equal, i.e. $G_r = G_a$. Thus, gains $G_1$ and $G_2$, defined above, are approximately equal since signals $E_r$ and $E_a$ are derived from signals $e_{r\text{-}avg}$ and $e_{a\text{-}avg}$ respectively through either common components, i.e., components 90, 97, 92 and 98, or through components having approximately equal gains, i.e., low-pass amplifiers 95 and 96. With signal $E_r$ being maintained at nearly a constant voltage as stated above, the gain $G_1$ must vary inversely with the magnitude of signal $e_{r\text{-}avg}$ which is accomplished by adjusting the gain of controlled-gain amplifier 90. With $G_2$ approximately equaling $G_1$ as stated above, the following set of equations can be written:

$$E_a = G_2 e_{a\text{-}avg} = G_1 e_{a\text{-}avg} = \frac{E_{r\text{-}const}}{e_{r\text{-}avg}} = E_{r\text{-}const} \frac{e_{a\text{-}avg}}{e_{r\text{-}avg}} \quad 5$$

The output voltage signal at the output of output amplifier 100, $E_o$, is proportional to the difference between signals applied to its inputs. This difference can be seen to be between $E_r$, which is a constant equal to the fixed voltage supplied by source 101, and $E_a$ which is given by the last written equations.

The output signal, $E_o$, of output amplifier 100 would then be composed of a constant term $E_r$, and a term depending on the ratio of effective input signals, $E_a$. The constant term isn't needed for the gas analysis result and it is desirable to eliminate it as well as to set a zero reference level for the ratio signal. This can be done by supplying a constant signal component in the $E_a$ signal. This is accomplished by placing constant voltage source 102 at an input of low-pass amplifier 96 as shown in FIG. 6. The voltage supplied by constant voltage source 102 is to include that supplied by constant voltage source 101, which is just the value that signal $E_r$ is forced to equal by the feedback loop involving integrating amplifier 99 and controlled gain amplifier 90. Also included in the voltage supplied by source 102 is the voltage necessary to correct for the fixed differences present in the optical paths for an analysis signal and for its corresponding reference signal. Source 102 can additionally be used to adjust the D.C. level, i.e. the zero reference level, from which the signal into device 29 will operate.

The signal at the output of output amplifier 100, $E_o$, is then proportional to the ratio of $e_{a\text{-}avg}$ to $e_{r\text{-}avg}$ as is desired. The above analysis is simplified to make clear the main considerations in the operation of the closed loop electronic network in the subchannel electronics. A more detailed analysis taking into account the forms of the signals, the dynamics of the various components and their filtering properties provides a more accurate picture of the actual behavior of the network but does not change these main results. It should be noted that output amplifier 100 is also a low-pass amplifier and so again acts as an averaging filter in the same sense as do low-pass filters 95 and 96 as explained above.

Providing, as an output, the ratio of input effective signals can be accomplished alternatively to what has just been described by the use of logarithmic amplifiers. The output is then provided by taking the difference between the logarithms of the effective input signals followed by taking the antilog of this difference.

The signal from output amplifier 100 is used to drive device 29 which may be a display of some type for immediate reading by an observer. Device 29 may also be an information processing and/or storage device for operating on the output data for later reference.

The embodiments of the invention in which an exclusive property or right is claimed are defined as follows:

1. A multi-component gas analysis apparatus for a selective analysis for one or more gases of interest in a gaseous mixture wherein each of said gases of interest has a characteristic infrared absorption spectrum associated therewith, said apparatus comprising:
a source of infrared radiation;
a first filter system for an analysis for a first gas of interest in said gaseous mixture, said first filter system having first and second filtering means:
said first filtering means having first and second filter elements aligned to receive said infrared radiation from said source during a first time duration, said first filter element being a filter cell means containing said first gas of interest at substantially constant pressure and said second filter element being a bandpass filter having a narrow passband which contains at least in part a strong absorption line of said first gas of interest, and
said second filtering means having a third filter element to receive said infrared radiation from said source during a second time duration, said third filter element being a bandpass filter having substantially said passband of said seond filter element;
detector means to receive said infrared radiation passed through both said gaseous mixture and said first filter system to provide a response in an output signal, said detector means being capable of an output signal response to received radiation in less than said first time duration and in less than said second time duration;
signal processing means to obtain from said output signal a first apparatus output indicating an analysis result as to said first gas of interest; and
synchronization means for synchronizing operation of said signal processing means to said first and second time durations.

2. The apparatus of claim 1, further comprising sample cell means for containing a sample of said gaseous mixture at substantially constant pressure.

3. The apparatus of claim 1, further comprising means for disposing said first and said second filtering means in a predetermined path including along said path said source of infrared radiation said sample cell and said detector means.

4. The apparatus of claim 3 wherein said means for disposing said first and said second filtering means in said predetermined path comprises a rotatable wheel having said first and said second filtering means fixed thereto in radial symmetry.

5. The apparatus of claim 4 further comprising means driving said wheel to dispose said first and said second filtering means repeatedly in said predetermined path.

6. The apparatus of claim 1 further comprising means for directing said infrared radiation along said predetermined path.

7. The apparatus of claim 1 wherein said second filtering means further comprises a fourth filter element aligned with said third filter element to receive said infrared radiation from said source during said second time duration, said fourth filter element being transparent to infrared radiation.

8. The apparatus of claim 7 wherein said fourth filter element comprises a filter element cell containing at substantially constant pressurre a gas transparent to infrared radiation.

9. The apparatus of claim 8, wherein said gas transparent to infrared radiation is nitrogen.

10. The apparatus of claim 8, wherein said first filtering system further comprises:
a fifth filter element aligned with said first and second filter elements to receive said infrared radiation from said source during said first time duration, said fifth filter element being a filter cell means for containing at substantially constant pressure a gas having an infrared absorption spectrum which overlaps that of said first gas of interest in said passband of said second filter element; and a sixth filter element aligned with said third filter element to receive said infrared radiation from said source during said second time duration, said sixth filter element being a filter cell means for containing a substantially constant pressure a gas having an infrared absorption spectrum which overlaps that of said first gas of interest in the passband of said third filter element.

11. The apparatus of claim 1 wherein said first and said second time durations are substantially equal.

12. The apparatus of claim 1 wherein said first and second time durations are less than 10 milliseconds.

13. The apparatus of claim 1 wherein said detector means comprises a single solid state detector.

14. The apparatus of claim 12 wherein said detector means is a photoconductive detector.

15. The apparatus of claim 12 wherein said detector means is a mercury cadmium telluride detector.

16. The apparatus of claim 1 wherein said output signal has a first signal lobe in said first time duration and a second signal lobe in said second time duration and said signal processing means provides an apparatus output related to a ratio of said first and second signal lobes.

17. The apparatus of claim 1 wherein said first filtering means has a fixed relationship to said second filtering means and a reference means is provided in a fixed relationship with both said first and second filtering means, said synchronizing means deriving through said reference means a reset triggering signal such that said reset triggering signal causes, upon its occurrence, electronic systems in said synchronizing means to be reset to a preselected electronic state.

18. The apparatus of claim 1 wherein said first filtering means has a fixed relationship to said second filtering means and a reference means is provided with said first filtering means, said synchronizing means deriving through said reference means a reset triggering signal during said first time duration such that said reset triggering signal causes, upon its occurrence, electronic systems in said synchronizing means to be reset to a preselected electronic state.

19. The apparatus of claim 18 wherein said synchronizing means has no electrical switching occurring therein during said first time duration except that switching required to provide said reset triggering signal and that switching which occurs in response to provision of said reset triggering signal.

20. The apparatus of claim 1 wherein said first filtering means has a fixed relationship to said second filtering means and a reference means is provided with said second filtering means, said synchronizing means deriving through said reference means a reset triggering signal in said second time duration such that said reset triggering signal causes, upon its occurrence, electronic systems in said synchronizing means to be reset to a preselected electronic state.

21. The apparatus of claim 20 wherein said synchronizing means has no electrical switching occurring therein during said second time duration except that switching required to provide said reset triggering signal and that switching which occurs in response to provision of said reset triggering signal.

22. The apparatus of claim 1 further comprising:

a second filter system for an analysis for a second gas of interest in said gaseous mixture means, said second filtering system having third and fourth filtering means:

said third filtering means having fourth and fifth filter elements aligned to receive said infrared radiation from said source during a third time duration, said fourth filter element being a filter cell means containing said second gas of interest at substantially constant pressure and said fifth filter element being a bandpass filter having a narrow passband which contains at least in part a strong absorption line of said second gas of interest, and said fourth filtering means having a sixth filter element to receive said infrared radiation from said source during a fourth time duration, said sixth filter element being a bandpass filter having substantially said passband of said fifth filter element;

said detector means to also receive said infrared radiation passed through both said gaseous mixture and said second filter system to provide response in said output signal, said detector means being capable of an output signal response to received radiation in less than said third time duration and in less than said fourth time duration;

said signal processing means to also obtain from said output signal a second apparatus output indicating an analysis result as to said second gas of interest; and said synchronization means to also synchronize operation of said signal processing means to said third and fourth time durations.

23. The apparatus of claim 22 further comprising sample cell means for containing a sample of said gaseous mixture at substantially constant pressure.

24. The apparatus of claim 22 further comprising; a rotatable filter wheel having said first through said fourth filtering means fixed thereto in radial symmetry and wherein the rotation of said filter wheel sequentially disposes said first through said fourth filtering means in a predetermined path including along said path said source of infrared radiation and said detector means.

25. The apparatus of claim 22 wherein said first through said fourth time durations are substantially equal.

26. The apparatus of claim 22 wherein first through said fourth time durations are less then 10 milliseconds.

27. The apparatus of claim 22 wherein said detector means is a single solid state detector.

28. The apparatus of claim 27 wherein said detector means is a photoconductive detector.

29. The apparatus of claim 27 wherein said detector means is a mercury cadmium telluride detector.

30. The apparatus of claim 22 wherein said output signal has a first signal lobe in said first time duration, a second signal lobe in said second time duration, a third signal lobe in said third time duration and a fourth signal lobe in said fourth time duration; and said first apparatus output is related to a ratio of said first and second signal lobes and said second apparatus output is related to a ratio of said third and fourth signal lobes.

31. The apparatus of claim 22 wherein said first filter system has a fixed relationship to said second filter system and a reference means is provided in a fixed relationship with both said first and second filter systems, said synchronizing means deriving through said reference means a reset triggering signal such that said reset triggering signal causes, upon its occurrence, electronic systems in said synchronizing means to be reset to a preselected electronic state.

32. The apparatus of claim 22 wherein said first filter system has a fixed relationship to said second filter system and a reference means is provided with said first filter system through which said synchronizing means derives a reset triggering signal during one of said first and second time durations, said reset triggering signal causing, upon its occurrence, electronic systems in said synchronizing means to be reset to a preselected electronic state.

33. The apparatus of claim 32 wherein said synchronizing means has no electrical switching occurring therein during said one of said first and second time durations in which said reset triggering signal is derived except that switching required to provide said reset triggering signal and that switching which occurs in response to provision of said reset triggering signal.

34. The apparatus of claim 22 wherein said first filter system has a fixed relationship to said second filter system and a reference means is provided in a fixed relationship with both said first and second filter systems, said synchronizing means deriving through said reference means a reset triggering signal such that said reset triggering signal causes, upon its occurrence, electronic systems in said synchronizing means to be reset to a preselected electronic state.

35. The apparatus of claim 22 wherein said first filter system has a fixed relationship to said second filter system and a reference means is provided with said first filter system through which said synchronizing means derives a reset triggering signal during one of said first and second time durations, said reset triggering signal causing, upon its occurrence, electronic systems in said synchronizing means to be reset to a preselected electronic state.

36. The apparatus of claim 35 wherein said synchronizing means has no electrical switching occurring therein during said one of said first and second time durations in which said reset triggering signal is derived except that switching required to provide said reset triggering signal and that switching which occurs in response to provision of said reset triggering signal.

37. The apparatus of claim 22 wherein said signal processing means has a channel demultiplexing switching means contained therein, said channel demultiplexing switching means, as controlled by said synchronizing means, to direct first and second channel signals, as derived from said first and second signal lobes, to a first subchannel electronic system and to direct third and fourth channel signals, as derived from said third and fourth signal lobes, to a second subchannel electronic system.

38. The apparatus of claim 37 wherein said signal processing means has a subchannel demultiplexing switching means provided in said first subchannel electronic system, said subchannel demultiplexing switching means, as controlled by said synchronizing means, to direct a first subchannel signal, as derived from a first channel signal, to a first averaging means having a first averaging means output signal and to direct a second subchannel signal, as derived from said second channel signal, to a second averaging means having a second averaging means output signal.

39. The apparatus of claim 38 wherein said first and second subchannel signals are derived from said first and second channel signals through a controlled gain element, said controlled gain element having its gain controlled by one of said first and second averaging means output signals through an electronic feedback loop.

40. The apparatus of claim 39 wherein said electronic feedback loop acts to hold substantially constant said one of said first and second averaging means output signals used to control said controlled gain element.

41. The apparatus of claim 40 wherein said first apparatus output is obtained from an output signal of an output amplifier which has as said output signal a signal proportional to a difference between said first and second averaging means output signals.

42. The apparatus of claim 41 wherein said first filter system has a fixed relationship to said second filter system and a reference means is provided in a fixed relationship with both said first and second filter systems, said synchronizing means deriving through said reference means a reset triggering signal such that said reset triggering signal causes, upon its occurrence, electronic systems in said synchronizing means to be reset to a preselected electronic state.

43. The apparatus of claim 42 wherein said first filter system has a fixed relationship to said second filter system and a reference means is provided with said first filter system through which said synchronizing means derives a reset triggering signal during one of said first and second time durations, said reset triggering signal causing, upon its occurrence, electronic systems in said synchronizing means to be reset to a preselected electronic state.

44. The apparatus of claim 42 wherein said signal processing means provides for a transmission of at least one of said signal lobes, said channel signals and said subchannel signals between two points by use of a capacitor means, said capacitor means being discharged to some voltage level after said transmission by having a switch close to provide a discharge path.

45. The apparatus of claim 44 wherein said synchronizing means has no electrical switching occurring therein during said one of said first and second time durations in which said reset triggering signal is derived except that switching required to provide said reset triggering signal and that switching which occurs in response to provision of said reset triggering signal.

46. A multi-component gas analysis apparatus for a selective analysis for a plurality of gases of interest in a gas sample wherein each of said gasses of interest has a characteristic infrared absorption spectrum associated therewith, said apparatus comprising:
  a source of infrared radiation;
  a sample cell means to contain said gas sample to be analyzed at substantially constant pressure;
  a plurality of filter systems each of which is associated with an analysis for a corresponding one of said plurality of gases of interest, each of said filter systems having first and second filtering means;
  said first filtering means having first and second filter elements aligned to receive said infrared radiation from said source during a time duration which forms part of a corresponding one of a plurality of periodic subsequences of a sequence of time durations, said first filter element being a filter cell means containing said corresponding gas of interest at substantially constant pressure and said second filter element being a bandpass filter having a narrow passband which contains at least in part a strong absorption line of said corresponding gas of interest, and said second filtering means having a third filter element to receive said infrared radiation from said source during another time duration which forms part of another corresponding one of said plurality of periodic subsequences being a bandpass filter, said third filter element having substantially said pass-band of said second filter element;

detector means to receive said infrared radiation passed through both said sample means and said plurality of filter systems to provide responses in an output signal, said detector means being capable of output signal responses to received radiation in less than each of said time durations;

signal processing means to obtain from said output signal an apparatus output indicating an analysis result as to each of said gases of interest; and synchronization means for synchronizing operation of said signal processing means to said periodic subsequences of saaid durations.

* * * * *